United States Patent [19]
Perkins

[11] 3,756,655
[45] Sept. 4, 1973

[54] SEAT ASSEMBLY
[75] Inventor: Jimmie G. Perkins, Allentown, Pa.
[73] Assignee: McCord Corporation, Detroit, Mich.
[22] Filed: Mar. 20, 1972
[21] Appl. No.: 236,291

[52] U.S. Cl................. 297/379, 180/113, 296/65 R
[51] Int. Cl............................ B60r 21/06, B60n 1/04
[58] Field of Search.................... 297/355, 356, 378, 297/379; 296/65 R, 65 A; 180/111–113, 82 R

[56] References Cited
UNITED STATES PATENTS
| | | | |
|---|---|---|---|
| 2,815,796 | 12/1957 | Lobanoff.......................... | 297/378 X |
| 3,433,524 | 3/1969 | Close ................................. | 296/65 R |
| 3,444,949 | 5/1969 | Pollock............................. | 296/65 A |
| 3,516,704 | 6/1970 | Riester.............................. | 296/65 R |

Primary Examiner—Casmir A. Nunberg
Attorney—Gerald E. McGlynn, Jr., Harold W. Milton, Jr. et al.

[57] ABSTRACT

An automobile seat assembly is provided with a latch mechanism to lock the seat back in the uprignt, seat forming position. The seat back includes a latching arm engaging a pin carried by a mounting bracket in a slot having an elongated portion and an end portion generally transverse to the elongated portion. The seat back is locked in the upright, seat forming position when the pin is in the end portion of the slot and misaligned with the elongated portion. When a vehicle door is opened, a solenoid connected to the pin is energized and the pin is aligned with the elongated portion of the slot to unlock the seat back. As an alternative, a manually operated release lever can be actuated to align the pin with the elongated portion of the slot to unlock the seat back.

9 Claims, 6 Drawing Figures

PATENTED SEP 4 1973 3,756,655

SEAT ASSEMBLY

This invention relates to a latch for a pivotally mounted seat back in an automobile seat.

Front seats for passenger automobiles with two doors have pivotally mounted seat backs to permit the seat back to be pivoted to fold the seat backs forward over the seat bottoms for greater access through the car doors to the rear seat. To reduce the hazards associated with pivotally mounted seat backs, passenger automobiles include lock arrangements to prevent the seat backs from pivoting during travel, for example, upon hard or sudden braking. When a lock or latch is included in a vehicle seat, the lock must be actuated to allow folding of the seat back forward over the seat bottom.

In the prior art, seat lock arrangements are both manually and automatically actuated. A manually actuated seat lock arrangement generally includes a lever or a button that controls the seat lock. Automatic seat lock arrangements typically include a solenoid controlled by the automobile door to operate a latch bolt for locking the seat back when the seat back is in the seat forming position and the car door is closed and to unlock the seat back when the car door is open. Lobanoff U.S. Pat. No. 2,815,796 discloses a solenoid actuated lock arrangement using a latch bolt in the manner described.

The automatic lock arrangements known in the prior art using a latch bolt include apertures aligned with the bolt to receive the bolt when the seat is latched. The present invention provides a solenoid actuated latch without requiring that mating parts be aligned prior to locking the seat back. Accordingly, the instant latch reduces the criticality of alignment characteristic of the prior art automatic lock arrangements.

Solenoid operated lock arrangements known in the prior art operate independently of any manual latch that may be included to lock the seat back in the seat forming position. The present invention provides a latch that is operated by a solenoid or in the alternative by a manually operated latch release means. Thus, the present invention provides the convenience of a solenoid controlled automatic latch with a manual override to permit the seat to be folded forward by manually actuating the latch even though the solenoid has not actuated the latch.

In the present invention, a mounting bracket including a slot having an elongated portion and an end portion substantially transverse to the elongated portion carries a pin in the slot to contro whether the seat back, when in the seat forming position, is locked or free to pivot. The seat back includes a latch arm disposed adjacent the end portion of the slot in the mounting bracket when the seat back is in the seat forming position. Accordingly, if the seat back is in the seat forming position and the pin is in the end portion of the slot and misaligned with the elongated portion of the slot, the seat back is locked and it is not possible to pivot the seat back. On the other hand, when the pin is aligned with or in the elongated portion of the slot, the latch arm engages and moves the pin in the elongated portion of the slot when the seat back is pivoted A solenoid and a manually operated release lever are connected with the pin to independently control its position when the pin is in the end portion of the slot in the mounting bracket. In this manner, when the seat back is in the seat forming position and the pin is positioned in the end portion of the slot to lock the seat back, the seat back can be unlocked by the action of the solenoid or by the action of the manually operated release lever.

Accordingly, it is an object of the present invention to provide a seat assembly including a seat back pivotally connected to a support means wherein there is connected with the seat back a latching means including a first member having a slot with an elongated portion and an end portion generally transverse to the elongated portion, a second member disposed adjacent the end portion of the slot when the seat back is in the upright position, and a pin that prevents the seat back from pivoting when the seat back is in the seat forming position and the pin is in the end portion and misaligned with the elongated portion but permits the seat back to pivot when the pin is aligned with the elongated portion and wherein the pin, when in the end portion of the slot, is aligned with the elongated portion of the slot by an automatic actuation means.

It is another object of the present invention to provide a latch for a seat back of the type described wherein a pin carried in a slot in a mounting bracket is effective to lock the seat back in the seat forming position and wherein a solenoid connected with the pin is effective to unlock the seat back when the solenoid is energized and wherein a manually operated release means connected with the pin is effective to unlock the seat back when the manually operated release means is actuated.

It is another object of the present invention to provide a latch of the type described wherein the mounting bracket is a bifurcated bracket straddling a latch arm attached to the seat back wherein the latch arm is disposed adjacent the slot in the mounting bracket and wherein the latch arm engages the pin carried in the mounting bracket when the seat back is in the seat forming position to prevent the seat back from being pivoted when the pin is in the end portion of the slot and misaligned with the elongated portion of the slot and wherein the latch arm engages the pin and moves the pin along the elongated portion of the slot when the pin is aligned with or in the elongated portion of the slot to permit the seat back to be pivoted.

It is another object of the present invention to provide a latch of the type described wherein a spring misaligns the pin with the elongated portion of the slot when the pin is in the end portion of the slot and neither the solenoid nor the manually operated release means is actuated.

It is another object of the present invention to provide a latch for a seat back in an automobile seat of the type described wherein a door switch is operative to energize the solenoid when the automobile door is open and to deenergize the solenoid when the automobile door is closed to thereby control whether the seat back is locked or unlocked.

The instant invention, together with further objects and advantages thereof, can be best understood by reference to the following description of the preferred embodiment, taken in connection with the accompanying drawings, in which.

Figure 1:
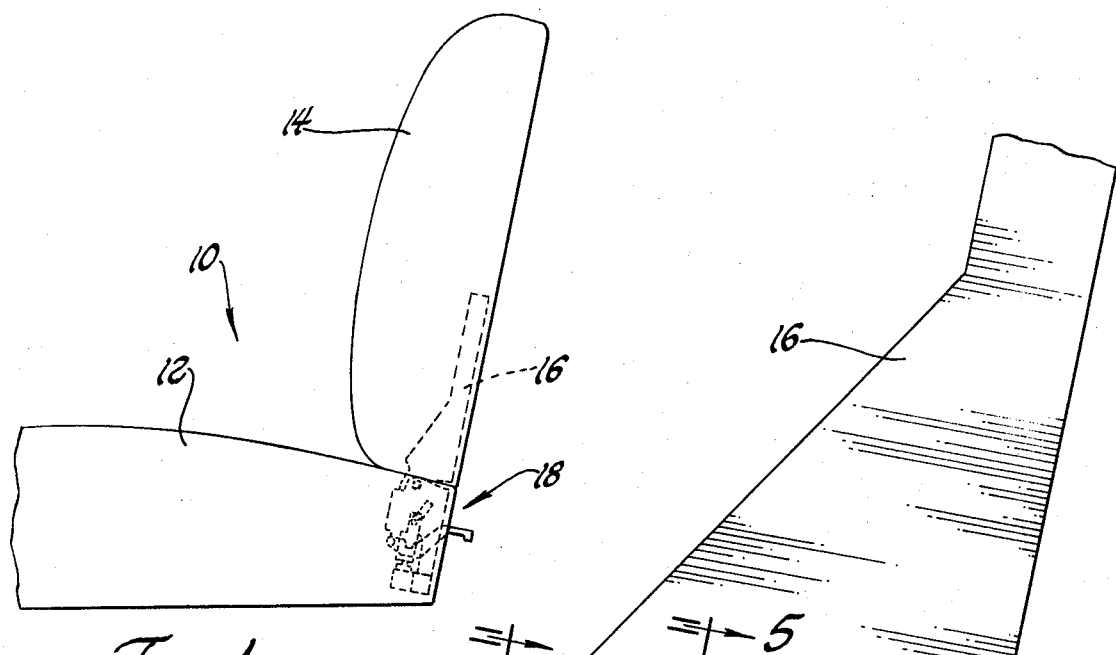
FIG. 1 is an automobile seat assembly with a pivotally mounted seat back including a latch according to the present invention.

Reference should now be made to the drawings and in particular to FIG. 1 wherein an automobile seat assembly 10 is shown including a seat bottom 12 and a pivotally mounted seat back 14 including a latch arm 16 attached to the seat back 14. The latch arm 16 supports the seat back 14 and is rigidly attached to the seat back 14. A latching means or latch generally shown at 18 is connected to the seat back 14 selectively preventing and allowing pivotal movement of the seat back 14. The latch 18 is operative to lock the seat back 14 in the upright, seat forming position by preventing movement by the latch arm 16 which in turn prevents movement by the seat back 14. When the seat back 14 is unlocked, the seat back 14 can be pivoted into a forwardly folded position over the seat bottom 12; for example, the seat back 14 is unlocked when the seat back 14 is pivoted forward for greater access to the rear seat (not illustrated).

Figure 3:
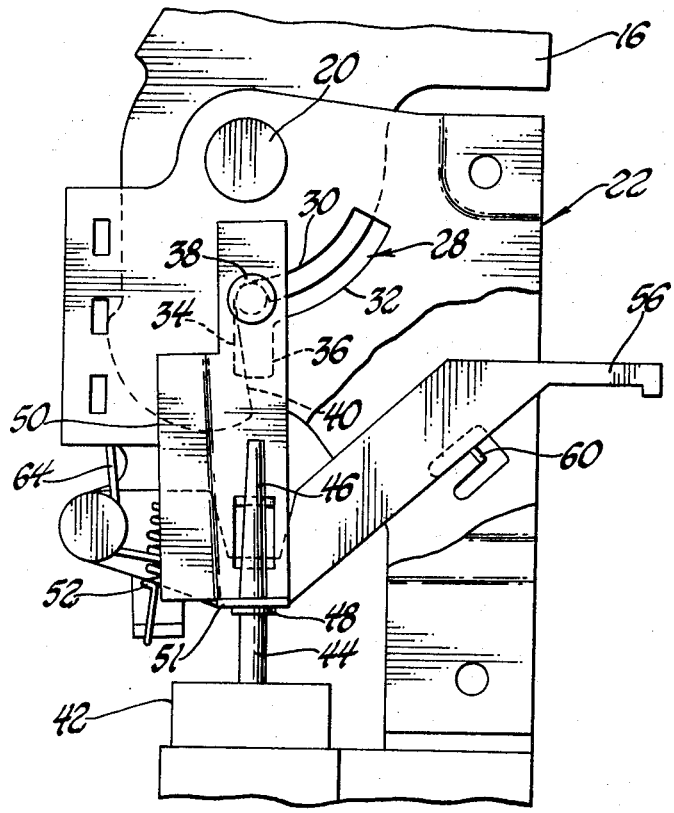
FIG. 3 is a view of the latch of the present invention in the unlocked position as effected when the solenoid is energized.
Figure 4:
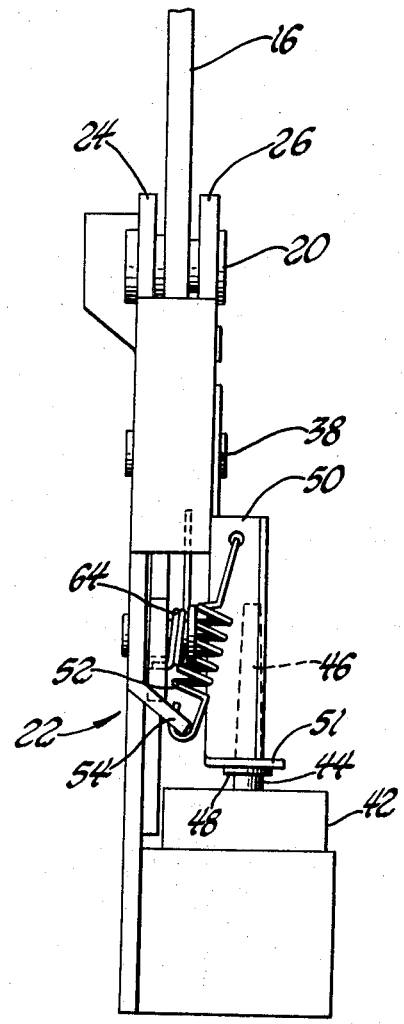
FIG. 4 is a section view of the latch of the present invention.
Figure 5:
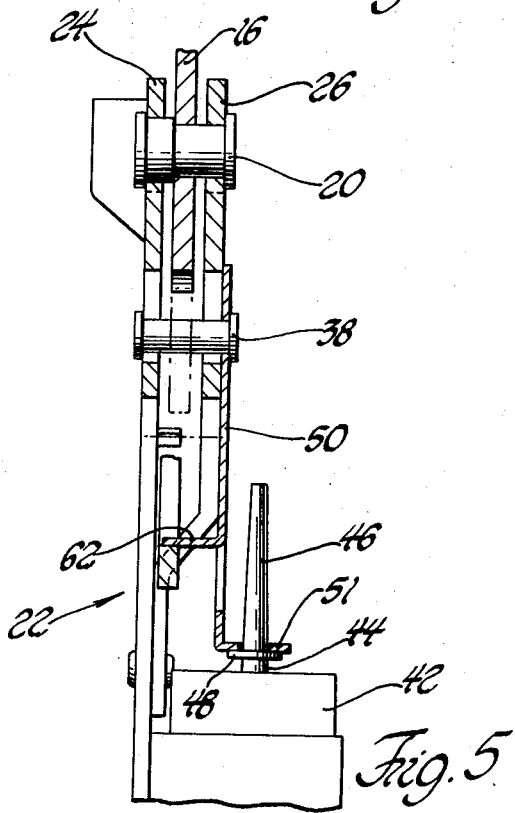
FIG. 5 is a section view of the latch of the present invention showing the pin and mounting bracket in detail; and, FIG. 6 is an electrical schematic for two seat-latch solenoids in a two-door automobile.

The design and operation of the latch 18 are fully illustrated in FIGS. 2 through 5. The latch arm 16 is pivotally mounted by a rivet 20 to a support means or mounting bracket 22 (FIG. 2) comprised of two members 24 and 26 which straddle the latch arm 16 (FIG. 5). The bifurcated mounting bracket 22 thus straddles the latch arm 16 which rotates within the mounting bracket 22 when the seat back 14 is pivoted forward over the seat bottom 12.

Figure 2:
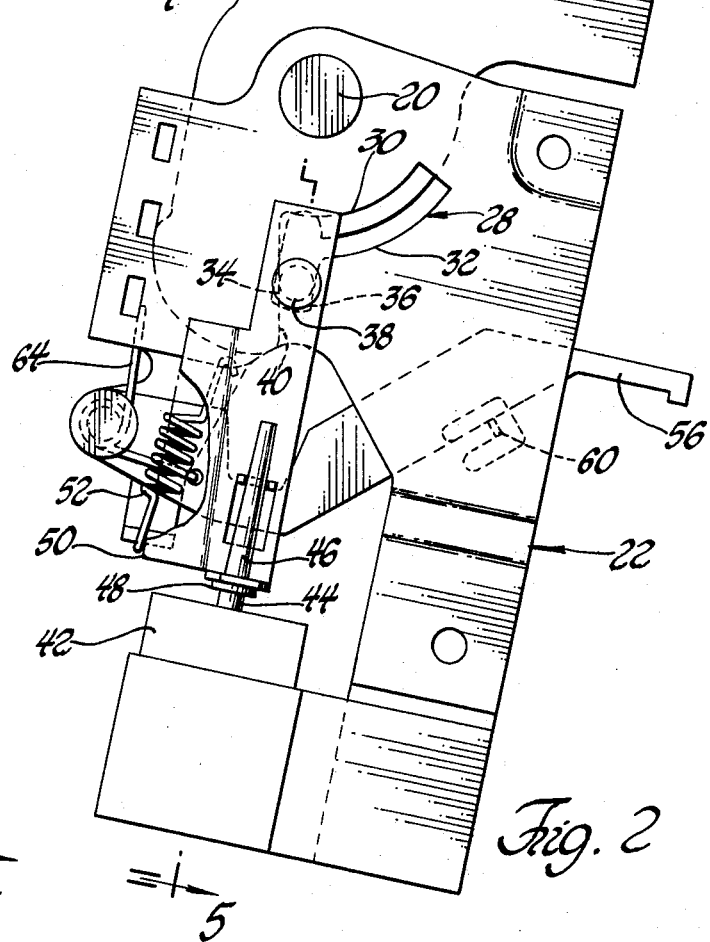
FIG. 2 is an enlarged and detailed view of the latch of the present invention.

The members 24 and 26 of the mounting bracket 22 have aligned slots 28 (FIG. 2). The slot 28 in the mounting bracket 22 has an elongated portion defined by two arcute concentric cylindrical surfaces 30 and 32 and an end portion substantially perpendicular to the elongated portion defined by two substantially vertical planar surfaces 34 and 36.

A pin 38 in the form of a rivet extends through the mounting bracket 22 and is carried in the slot 28 in the mounting bracket 22. Accordingly, the latch 18 comprises a first member, the mounting bracket 22, a second member, the latch arm 16, and the pin 38. In the operation of the latch 18, the pin 38 is movable in both the elongated portion and the end portion of the slot 28. The latch arm 16 includes an integral extension having an edge 40 disposed adjacent the planar surface 34 of the slot 28 in the mounting bracket 22 when the seat back 14 is in the seat forming position such that when the pin 38 is in the end portion of the slot 28 and misaligned with the elongated portion of the slot 28, the seat back 14 is locked in the seat forming position by the coaction of the edge 40 of the integral extension, the pin 38, and the planar surface 36. If force is applied to the seat back 14 to pivot it forward over the seat bottom 12, the edge 40 engages the pin 38 and urges it against the surface 36 which prevents movement by the pin 38 or the edge 40 which in turn prevents rotation by the latch arm 16 and the seat back 14.

An automatic actuation means in the form of a solenoid 42 is operative to align the pin 38 with the elongated portion of the slot 28 when the pin 38 is in the end portion of the slot 28. When the solenoid 42 is energized to align the pin 38 with the elongated portion of the slot 28, (FIG. 3). the integral extension of the latch arm 16 can be pivot about the rivet 20. When the seat back 14 is folded forward over the seat bottom 12, the integral edge 40 engages the pin 38 and moves the pin along the elongated portion of the slot 28. Accordingly, when the solenoid 42 is energized, the seat back 14 is unlocked and the seak back 14 is freely pivoted to fold the seat back 14 forward over the seat bottom 12.

The solenoid 42 has an armature 44 including a tapered section 46 and a shoulder 48 which cooperate with a lost motion means or release bracket 50 connected with the pin 38 to actuate the latch and unlock the seat back 14 when the solenoid 42 is energized as shown in FIG. 5. The release bracket 50 is captured by a rivet head of the pin 38 and connected to the solenoid 42 by a flange 51, having a hold through which the tapered section 46 of the armature 44 of the solenoid 42 passes, comprising a lost motion connection between the release bracket 50 and the solenoid 42.

A biasing means or return spring 52 is connected with the release bracket 50 to misalign the pin 38 with the elongated portion of the slot 28 when the pin 38 is in the end portion of the slot 28 and the solenoid 42 is deenergized. As shown in FIG. 4, the return spring 52 is hooked over an integral tab 54 of the member 24 and onto the release bracket 50. Accordingly, when the solenoid 42 is energized and the release bracket 50 is actuated to align the pin 38 with the elongated portion of the slot 28, the spring 52 applies a restoring force to the release bracket 50 and the pin 38 is moved into misalignment with the elongated portion of the slot 28 under the influence of this restoring force when the solenoid 42 is deenergized.

A manually operated release means or lever 56 is pivotally riveted to the mounting bracket 22 as shown in FIG. 3. A tab 60 integral with the member 24 of the mounting bracket 22 limits the travel of the manually operated release lever 56 when the release lever 56 is not actuated. A tab 62 (FIG. 5) formed integrally with the release bracket 50 provides a lost motion connection between the manually operated release lever 56 and the release bracket 50. Accordingly, when the solenoid 42 is deenergized, the release bracket 56 can be actuated to align the pin 38 with the elongated portion of the slot 28 to unlock the seat back 14 to permit the seat back 14 to be pivoted forward over the seat bottom 12. A release lever return spring 64 (FIG. 3) preloads the manually operated release lever 56 and retains it in the normally unactuated position. If the manually operated release lever 56 is actuated to unlock the seat back 14, the release lever return spring 64 returns the manually operated release lever 56 to the initial position in contact with the tab 60 when the operating force applied to the manually operated release lever 56 is removed.

Figure 6:
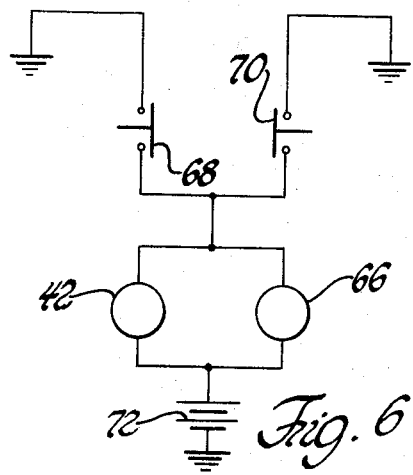

An electrical schematic for a two-door vehicle having a latch mechanism according to the present invention for each front seat is shown in FIG. 6. The solenoid 42 is the solenoid for the latch mechanism described above for the seat assembly 10 illustrated in FIG. 1. A second solenoid 66 actuates an identical latch mechanism installed with the seat back of the second front seat (not illustrated) of the automobile. Two door switches 68 and 70 are operated by the vehicle doors such that a respective switch is closed if the associated door is open and is open if the associated door is closed. The vehicle battery 72 completes the circuit schematic. If either vehicle door is open, both solenoids 42 and 66 are energized by the battery 72 and both seat latches are actuated to unlock both front seats to permit each to be pivoted forward over its respective seat bottom. When both vehicle doors are closed, both solenoids are deenergized and the latching mechanisms for the two seat backs remain locked until and unless the manually operated release lever of the associated seat is actuated to unlock that seat or until a vehicle door is opened.

Although the foregoing has proceeded in terms of a particular preferred embodiment, it should be understood that various changes and modifications could be engrafted thereon by one skilled in the art within the spirit and scope of the appended claims.

The embodiments of the invention in which an exclusive property or privilege is claimed are defined as follows:

1. A seat assembly, comprising: a support means; a seat back pivotally connected to said support means for movement between an upright, seat forming position and a forwardly folded position; a latching means connected to said seat back selectively preventing and allowing pivotal movement of said seat back, said latching means including a first member having a slot with an elongated portion and an end portion generally transverse to the elongated portion, said latching means including a second member disposed adjacent the end portion of the slot when said seat back is in the seat forming position, and said latching means including a pin extending through the slot for preventing pivotal movement of said seat back when said pin is in the end portion of the slot and misaligned with the elongated portion of the slot and for allowing pivotal movement of said seat back when said pin is aligned with the elongated portion of the slot; and automatic actuation means for automatically actuating said latching means to align said pin, when in the end portion of the slot, with the elongated portion of the slot.

2. A seat assembly as in claim 1 including a manually operated release means to actuate said latching means to align said pin, when in the end portion of the slot, with the elongated portion of the slot and a lost motion means connecting both said automatic actuation means and said manually operated release means with said pin.

3. A seat assembly as in claim 2 including a biasing means connected with said lost motion means to misalign said pin with the elongated portion of the slot when said pin is in the end portion of the slot.

4. A seat assembly as in claim 3 wherein said manually operated release means is pivotally mounted to said first member of said latching means.

5. A seat assembly as in claim 4 wherein said automatic actuation means is a solenoid.

6. A seat assembly as in claim 5 including a door-actuated switch to control the energization of said solenoid.

7. A seat assembly as in claim 6 wherein the armature of said solenoid includes a tapered section and wherein said lost motion means includes a flange with a hole through which said tapered section is passed to effect the lost motion connection between said solenoid and said lost motion means.

8. A seat assembly as in claim 7 wherein said lost motion means includes a tap providing a lost motion connection between said lost motion means and said manually operated release means.

9. An automobile seat as in claim 8 wherein said first member of said latching means is a bifurcated mounting bracket; said econd member of said latching means is a latch arm attached to said seat back; said support means is integral with said bifurcated mounting bracket such that seat back is pivotally connected to said bifurcated mounting bracket for movement between an upright, seat forming position and a forwardly folded position; the end portion of the slot in said bifurcated mounting bracket is a substantially vertical slot; the elongated portion of the slot in said bifurcated mounting bracket is a substantially arcuate slot; said lost motion means is a bracket; said biasing means connected to said lost motion means is a spring; and said manually operated release means is a lever pivotally mounted on said bifurcated mounting bracket.

* * * * *